(12) United States Patent
Goto et al.

(10) Patent No.: US 11,683,089 B2
(45) Date of Patent: Jun. 20, 2023

(54) RADIO COMMUNICATION SYSTEM, RADIO COMMUNICATION METHOD, AND BASE STATION DEVICE

(71) Applicant: NIPPON TELEGRAPH AND TELEPHONE CORPORATION, Tokyo (JP)

(72) Inventors: Daisuke Goto, Musashino (JP); Fumihiro Yamashita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/254,845

(22) PCT Filed: Jun. 19, 2019

(86) PCT No.: PCT/JP2019/024340
§ 371 (c)(1),
(2) Date: Dec. 21, 2020

(87) PCT Pub. No.: WO2020/004187
PCT Pub. Date: Jan. 2, 2020

(65) Prior Publication Data
US 2021/0266062 A1 Aug. 26, 2021

(30) Foreign Application Priority Data
Jun. 25, 2018 (JP) .............................. JP2018-120036

(51) Int. Cl.
*H04B 7/208* (2006.01)
*H04W 56/00* (2009.01)
(Continued)

(52) U.S. Cl.
CPC ........ *H04B 7/208* (2013.01); *H04W 56/0015* (2013.01); *H04W 72/0453* (2013.01); *H04W 84/06* (2013.01)

(58) Field of Classification Search
CPC .. H04B 7/208; H04B 7/1851; H04B 7/18513; H04B 7/18541; H04W 56/0015; H04W 72/0453; H04W 84/06; H04W 16/28
See application file for complete search history.

(56) References Cited

U.S. PATENT DOCUMENTS

2018/0278325 A1* 9/2018 Feki ..................... H04B 7/2606

OTHER PUBLICATIONS

Low Earth Orbit Satellite Communications Systems, Institute of Electronics, Information and Communication Engineers, Publication, Jun. 20, 1999, pp. 128-133.
(Continued)

*Primary Examiner* — Eric Myers
(74) *Attorney, Agent, or Firm* — Harness, Dickey & Pierce, P.L.C.

(57) ABSTRACT

In a wireless communication system that includes a base station, a plurality of relay stations that are moving, and a plurality of terminal stations in a service area, and performs downlink multiple access from the base station to each of the plurality of terminal stations via one or more relay stations of the plurality of relay stations, the base station includes a downlink multiple access unit configured to identify a relay station of the plurality of relay stations transmitting a signal receivable in the service area based on positions of the plurality of relay stations, frequency multiplex-transmit a data signal in a different frequency band to each of the plurality of terminal stations via the relay station, and spatial multiplex-transmit a data signal to a terminal station of the plurality of terminal stations supporting spatial multiplex transmission in a particular frequency band and via the plurality of relay stations.

4 Claims, 7 Drawing Sheets

(51) Int. Cl.
*H04W 72/0453* (2023.01)
*H04W 84/06* (2009.01)

(56) References Cited

OTHER PUBLICATIONS

R.T. Schworz et al., Optimum-capacity MIMO satellite link for fixed and mobile services, Int. ITG Work. Smart Antennas, Feb. 2008, pp. 209-216.
Shaohui Sun et al., Interference Management Through Comp in 3GPP LTE-Advanced Networks, IEEE Wireless Communications, vol. 20, No. 1, 2013, pp. 59-66.
Daisuke Goto and Fumihiro Yamashita, Capacity evaluation under channel estimation using unique word in multi-satellite/multi-beam MIMO systems, IEICE Technical Report, vol. 117, No. 174, 2017, pp. 69-74.
Daisuke Goto et al., A study on Low Earth Orbit(LEO) MIMO systems for achieving high capacity, The Institute of Electronics, Information and Communication Engineers (IEICE) Conference 2018, Mar. 20, 2018.

\* cited by examiner

| KNOWN SIGNAL FOR SYNCHRONIZATION AND ESTIMATION | RELAY STATION ID | TARGET TERMINAL STATION ID | DATA SIGNAL FREQUENCY BAND INFORMATION |
|---|---|---|---|

Fig. 5

| KNOWN SIGNAL FOR SYNCHRONIZATION | TERMINAL STATION ID | REQUESTING RELAY STATION ID |
|---|---|---|

Fig. 6

RADIO COMMUNICATION SYSTEM, RADIO COMMUNICATION METHOD, AND BASE STATION DEVICE

CROSS-REFERENCE TO RELATED APPLICATIONS

This application is a 371 U.S. National Phase of International Application No. PCT/JP2019/024340, filed on Jun. 19, 2019, which claims priority to Japanese Application No. 2018-120036 filed on Jun. 25, 2018. The entire disclosures of the above applications are incorporated herein by reference.

TECHNICAL FIELD

The present disclosure relates to a wireless communication system that is constituted of one base station, a plurality of moving relay stations, and a plurality of terminal stations, and performs downlink multiple access via one or more relay stations to which the base station and each terminal station can be connected, a wireless communication method, and a base station apparatus.

BACKGROUND ART

A low earth orbit satellite (LEO) system has the advantage of low-latency and low-attenuation communication by performing communication using a lower orbit (800 to 2000 km) satellite than a stationary satellite as compared to a geostationary satellite (GEO) with a stationary orbit (altitude of about 36,000 km). On the other hand, because the satellites orbit changes at all times as seen from the global station, it is necessary to construct the service area by forming a satellite constellation using a plurality of satellites. As a result, there are many situations in which the terminal station can receive signals from a plurality of satellites.

Conventional Example 1

In Non Patent Literature 1, the LEO system adopts a handover control scheme. According to this scheme, a plurality of LEO satellites to which different frequency bands are allocated are deployed in one service area, and each terminal station selects the most suitable satellite, for example, a satellite having high reception power, from among a plurality of satellites present in the receivable region. As a result, the larger the number of satellites, the higher the connectivity with the terminal station. On the contrary, the frequency utilization efficiency is disadvantageously reduced by allocating frequency to a plurality of satellites. Because the frequency band used in one service area needs to be divided into the expected number of satellites, the larger the number of satellites, the less bandwidth allocated per satellite. Furthermore, because the LEO system has a high relative moving speed when viewed from the terminal station and undergoes a large Doppler shift, the guard band between adjacent bands needs to be set in consideration of a large frequency deviation, which is a factor to further reduction of the frequency utilization efficiency.

Conventional Example 2

In contrast, methods have been considered in which a plurality of satellites are used in the same band and separated by signal processing. According to Non Patent Literature 2, based on MIMO (Multi-Input Multi-Output) transmission between a plurality of stationary satellites and a terminal station having a plurality of reception antennas, antenna placement optimization for increasing transmission capacity has been discussed. However, since the present discussion assumes the stationary satellites, the effects of dynamic Doppler frequencies assuming the LEO system have not been considered.

Conventional Example 3

On the other hand, in ground wireless communication, there is a technique of Coordinated Multipoint (CoMP) as multiplex transmission using a plurality of relay stations (RRH). Non Patent Literature 3 discloses the technique that the base station (eNodeB) uses the own antennas or RRH to perform coordinated transmission, and because wired connection such as optical fiber between the base station and the RRH is assumed, frequency synchronization can be made in advance at transmission. On the contrary, in the currently assumed MIMO transmission using the LEO satellite, synchronization of the satellites must be made in a wireless manner. Further, in the LEO system, relative speed varies depending on the relative relationship between the satellite (relay station) and the terminal station and thus, it is difficult to previously perform time/frequency synchronization in multiple access.

Conventional Example 4

Non Patent Literature 4 focuses on frequency asynchrony of multiple satellites (relay stations) performing MIMO transmission, and proposes a channel estimation and timing detection method that use a long-distributed preamble.

CITATION LIST

Non Patent Literature

Non Patent Literature 1: "Low Orbit Satellite Communication System," supervised by ITO Yasuhiko, Institute of Electronic and Communication Engineers, 1999.

Non Patent Literature 2: R. T. Schworz, A. Knopp, D. Ogermann, C. A. Hofmann, B. Lankl, "Optimum-capacity MIMO satellite link for fixed and mobile services," in Int. ITG Work. Smart Antennas, W S A 2008, pp. 209-216, February 2008.

Non Patent Literature 3: S. Sun, Q. Gao, Y. Peng, Y. Wang, and L. Song, "Interference management through CoMP in 3GPP LTE-advanced networks," IEEE Wireless Communications, vol. 20, no. 1, pp. 59-66, 2013.

Non Patent Literature 4: Daisuke Goto, Fumihiro Yamashita, "Capacity evaluation under channel estimation using unique word in multi-satellite/multi-beam MIMO systems," technical research report of the Institute of Electronics, Information and Communication Engineers, SAT, satellite communication, vol. 117, no. 174, pp. 69-74, August 2017.

SUMMARY OF THE INVENTION

Technical Problem

In Conventional Example 4, because synchronization in the same frequency band is assumed, a large amount of preamble length is required to prevent a deterioration in the channel estimation accuracy due to inter-channel interference, resulting in a reduction in the frequency utilization efficiency. Furthermore, since the stationary satellite is assumed in this scheme, it is possible to fixedly set the number of satellites used in the system in advance. However, in the case of the LEO system, such fixed setting is difficult because the number of satellites transmitting signals receivable in the service area dynamically fluctuates and thus, the number of multiplexed satellites changes depending on the communication environment. Accordingly, it is desirable to provide a method that can dynamically change the number of multiplexed satellites based on the communication environment and performances of the terminal station, even in the same service area.

An object of the present disclosure is to provide, in a wireless communication system including a plurality of moving relay stations, a wireless communication system, a wireless communication method, and a base station apparatus, in which a base station can dynamically set a spatial multiplex transmission band based on the number of relay stations transmitting a signal receivable by a terminal station.

Means for Solving the Problem

A first aspect is a wireless communication system that includes a base station, a plurality of relay stations that are moving, and a plurality of terminal stations in a service area, and performs downlink multiple access from the base station to each of the plurality of terminal stations via one or more relay stations of the plurality of relay stations, in which the base station includes a downlink multiple access unit configured to identify a relay station of the plurality of relay stations transmitting a signal receivable in the service area based on positions of the plurality of relay stations, frequency multiplex-transmit a data signal in a different frequency band to each of the plurality of terminal stations via the relay station, and spatial multiplex-transmit a data signal to a terminal station of the plurality of terminal stations supporting spatial multiplex transmission in a particular frequency band and via the plurality of relay stations.

In the wireless communication system according to the first aspect, the downlink multiple access unit of the base station includes a unit configured to transmit a downstream control signal, in a distinct frequency band, from the relay station transmitting a signal receivable in the service area, the downstream control signal including a relay station ID, the terminal station includes a downlink multiple access unit configured to receive the downstream control signal that is receivable, estimate channel information between the relay station and the terminal station from the downstream control signal that is used for synchronization, select one or more relay stations of the plurality of relay stations transmitting a receivable signal based on the channel information, and notify the base station of the one or more relay stations that are selected, and the downlink multiple access unit of the base station includes a unit configured to allocate the particular frequency band in which a data signal addressed to the terminal station is spatial multiplex-transmitted via the one or more relay stations selected by the terminal station, notify the terminal station of information regarding the particular frequency band that is allocated using the downstream control signal, and spatial multiplex-transmit the data signal addressed to the terminal station.

In the wireless communication system according to the first aspect, the downstream control signal and the data signal both addressed to the terminal station are generated from a baseband signal and are synchronized with each other, and the downlink multiple access unit of the terminal station includes a unit configured to demultiplex and demodulate the data signal that is spatial multiplex-transmitted using the channel information estimated from the downstream control signal.

In the wireless communication system according to the first aspect, the downlink multiple access unit of the terminal station is configured to monitor the downstream control signal of the one or more relay stations, re-select, when a relay station of the plurality of relay stations transmitting the receivable signal changes, a relay station of the plurality of relay stations through which the spatial multiplex transmission is requested to be performed, and notify the base station of the relay station that is re-selected.

The second aspect is a method of wireless communication that includes a base station, a plurality of relay stations that are moving, and a plurality of terminal stations in a service area, and performs downlink multiple access from the base station to each of the plurality of terminal stations via one or more relay stations of the plurality of relay stations, including by a downlink multiple access unit of the base station, identifying a relay station of the plurality of relay stations transmitting a signal receivable in the service area based on positions of the plurality of relay stations, frequency multiplex-transmitting a data signal in different frequency bands to each of the plurality of terminal stations via the relay station, and spatial multiplex-transmitting a data signal to a terminal station of the plurality of terminal stations supporting spatial multiplex transmission in a particular frequency band and via the plurality of relay stations.

The method of wireless communication according to the second aspect further including, by the downlink multiple access unit of the base station, transmitting a downstream control signal, in a distinct frequency band, from the relay station transmitting a signal receivable in the service area, the downstream control signal including a relay station ID, by a downlink multiple access unit of the terminal station, receiving the downstream control signal that is receivable, synchronizing with the downstream control signal that is received, estimating channel information between the relay station and the terminal station from the downstream control signal that is used for synchronization, selecting one or more relay stations of the plurality of relay stations transmitting a receivable signal based on the channel information, and notifying the base station of the one or more relay stations that are selected, and by the downlink multiple access unit of the base station, allocating the particular frequency band in which a data signal addressed to the terminal station is spatial multiplex-transmitted via the one or more relay stations selected by the terminal station, notifying the terminal station of information regarding the particular frequency band that is allocated using the downstream control signal, and spatial multiplex-transmitting the data signal addressed to the terminal station.

The method of wireless communication according to the second aspect, in which the downstream control signal and the data signal both addressed to the terminal station are generated from a baseband signal and are synchronized with each other, the method further including by the downlink multiple access unit of the terminal station, demultiplexing and demodulating the data signal that is spatial multiplex-transmitted using the channel information estimated from the downstream control signal.

A third aspect is a base station apparatus of a wireless communication system that includes a base station, a plurality of relay stations that are moving, and a plurality of terminal stations in a service area, and performs downlink multiple access from the base station to each of the plurality of terminal stations via one or more relay stations of the plurality of relay stations, and the base station includes a downlink multiple access unit configured to identify a relay station of the plurality of relay stations transmitting a signal receivable in the service area based on positions of the plurality of relay stations, frequency multiplex-transmit a data signal in a different frequency band to each of the plurality of terminal stations via the relay station, and spatial multiplex-transmit a data signal to a terminal station of the plurality of terminal stations supporting spatial multiplex transmission in a particular frequency band and via the plurality of relay stations.

Effects of the Invention

According to the present disclosure, in a wireless communication system including a plurality of moving relay stations, because the base station can dynamically set the MIMO transmission band based on the number of relay stations transmitting a signal receivable by the terminal station, the frequency band for spatial multiplex transmission can be shared by the plurality of relay stations wherever possible, thereby improving the frequency utilization efficiency.

BRIEF DESCRIPTION OF DRAWINGS

FIG. 5 is a diagram illustrating a frame format of a downstream control signal.

FIG. 6 is a diagram illustrating a frame format of an upstream control signal.

DESCRIPTION OF EMBODIMENTS

System Configuration

Figure 1:
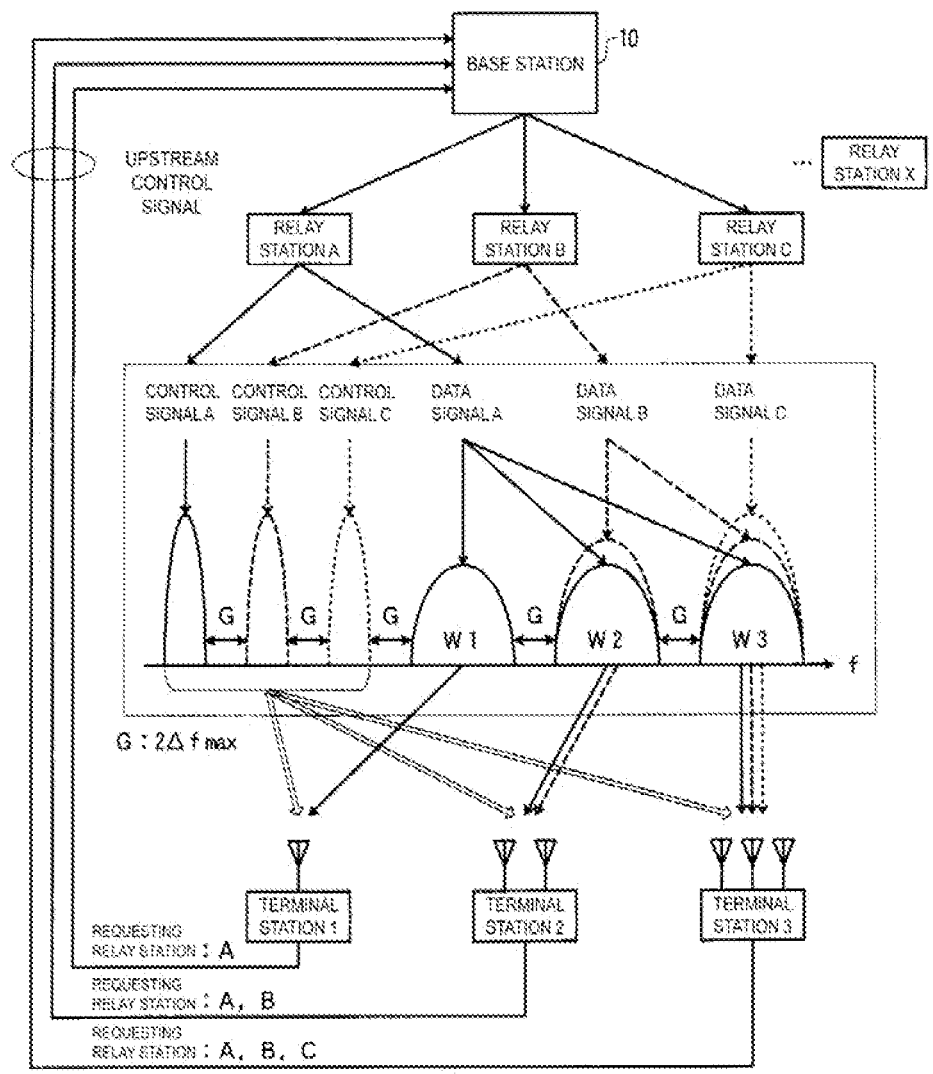
FIG. 1 is a diagram illustrating a configuration example of a wireless communication system according to the present disclosure.

FIG. 1 illustrates a configuration example of a wireless communication system according to the present disclosure.

In FIG. 1, the wireless communication system includes a base station 10, a plurality of moving relay stations A, B, C, . . . , X, and a plurality of (here, three) terminal stations 1, 2, and 3 in a service area, and has a downlink multiple access configuration that enables multiplex transmission to the plurality of terminal stations in the service area by an FDMA mode, and MIMO (spatial multiplex) transmission only to the terminal station capable of performing equalization and demultiplexing for each frequency band. Each of the terminal stations includes one or more antennas. For simplicity, the terminal stations 1, 2, and 3 herein each include 1, 2, and 3 antennas, respectively, and MIMO transmission is applicable to the terminal stations 2 and 3 having two or more antennas.

It is assumed that downlink signals from the relay station arranges a control signal and a data signal in different frequency bands, the frequency band of the control signal is fixed and known to the terminal station, and the frequency bands W1, W2, and W3 of the data signal can be dynamically changed. Here, alphabets of the relay stations A, B, and C, the control signals A, B, and C, and the data signals A, B, and C correspond to one another one-to-one, and the relay station A transmits the control signal A and the data signal A.

The base station 10 grasps the position information about the relay stations A to X, and identifies the relay station transmitting a signal receivable in the service area, based on the positions of the relay stations. Here, the signals transmitted from the three relay stations A, B, and C are receivable in the service area. Note that in the case where the relay stations are artificial satellites moving on a predetermined orbit, the base station 10 grasps the current position of each relay station from the orbit information. In the case of the relay stations moving on the ground, the base station 10 acquires position information acquired by each relay station using GPS or the like via a ground network.

The base station 10 causes the relay stations A, B, and C to transmit the control signals A, B, and C receivable in the service area, respectively, which are allocated to different frequency bands. On the other hand, the terminal stations 1, 2, and 3 in the service area each receive the receivable control signal among the control signals A, B, and C transmitted from the relay stations A, B, and C to perform synchronization processing, and grasp the relay stations transmitting the receivable signal and the number of the relay stations. Furthermore, the terminal station estimates channel information between the corresponding relay station and the terminal station by using the synchronized control signal, and notifies the base station 10 of information about the relay station for requesting MIMO transmission based on the relay station transmitting the receivable signal and the estimated channel information, via any uplink.

The base station 10 allocates the relay station requested by each terminal station and the frequency band of the data signal, notifies each terminal station of the information using the control signal, and starts MIMO transmission via the corresponding relay station. In the example in FIG. 1, the signal addressed to the terminal station 1 is transmitted from the relay station A in the frequency band W1. Signals addressed to the terminal station 2 are MIMO-transmitted from the relay stations A and B in the frequency band W2. Signals addressed to the terminal station 3 are MIMO-transmitted from the relay stations A, B, and C in the frequency band W3. The relay stations A, B, and C basically have only the function of relaying and transmitting the signals received from the base station 10 in a receivable state to the terminal stations 1, 2, and 3 by performing frequency conversion and amplification of the signals received from the base station 10.

Note that because the control signal and the data signal are generated from the same baseband signal, the signals are assumed to be synchronized. For this reason, the data signal can be also synchronized by synchronization using the control signal, and the terminal station receives and equalizes the data signal according to the notified information to demodulate data. Furthermore, a weight matrix for the equalization of the MIMO signal is calculated from the channel information of the control signal, and the spatial multiplexed signals of each relay station are separated to demodulate data. Furthermore, in the case where, like the satellite, the relay station performs communication in a line-of-sight environment, and has a channel characteristic with a small frequency selectivity, the synchronization and channel information using the control signal can be reflected on the equalization of the data signal. At this time, by setting a guard band between FDMA signals (G in the figure) to a value that is twice a maximum Doppler frequency Δfmax assumed in the system, inter-carrier interference can be avoided.

Configuration of Base Station 10

Figure 2:
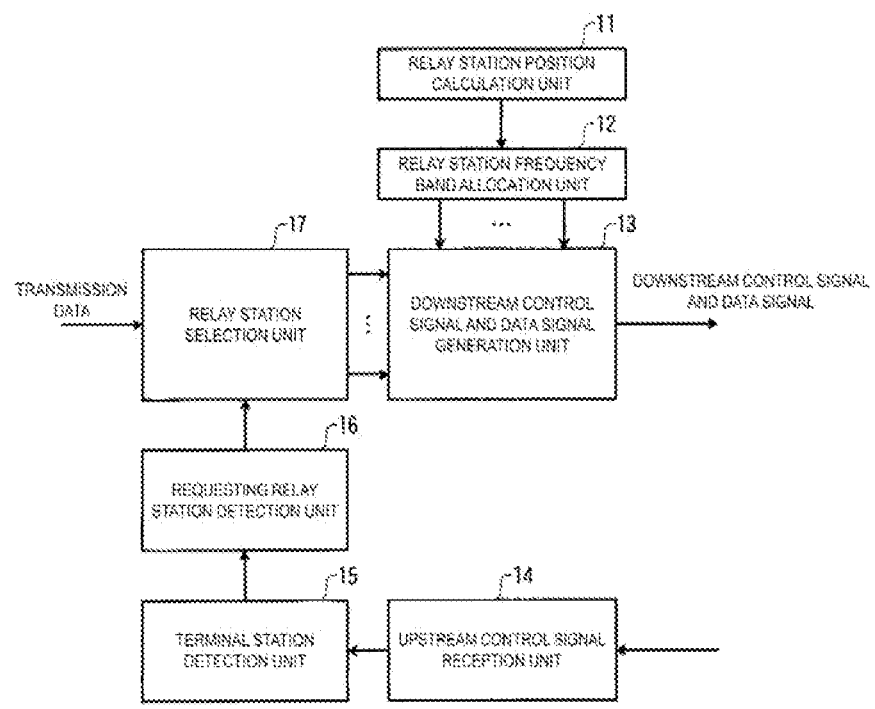
FIG. 2 is a diagram illustrating a configuration example of a base station 10.

FIG. 2 illustrates a configuration example of the base station 10.

In FIG. 2, the base station 10 includes a relay station position calculation unit 11 and a relay station frequency band allocation unit 12, and allocates frequency to the downstream control signal according to the position of each relay station. The base station 10 further includes a downstream control signal and data signal generation unit 13, an upstream control signal reception unit 14, a terminal station detection unit 15, a requesting relay station detection unit 16, and a relay station selection unit 17.

Configuration of Relay Stations A, B, and C

Figure 3:
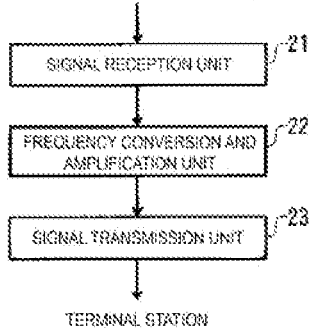
FIG. 3 is a diagram illustrating a configuration example of relay stations A, B, and C.

FIG. 3 illustrates a configuration example of the relay stations A, B, and C.

In FIG. 3, the relay stations A, B, and C each include a signal reception unit 21, a frequency conversion and amplification unit 22, and a signal transmission unit 23. The relay stations A, B, and C of the wireless communication system basically have a function of receiving signals from the base station 10 and performing only frequency conversion and signal amplification for transmission of the signals to the terminal stations 1, 2, and 3.

Configuration of Terminal Stations 1, 2, and 3

Figure 4:
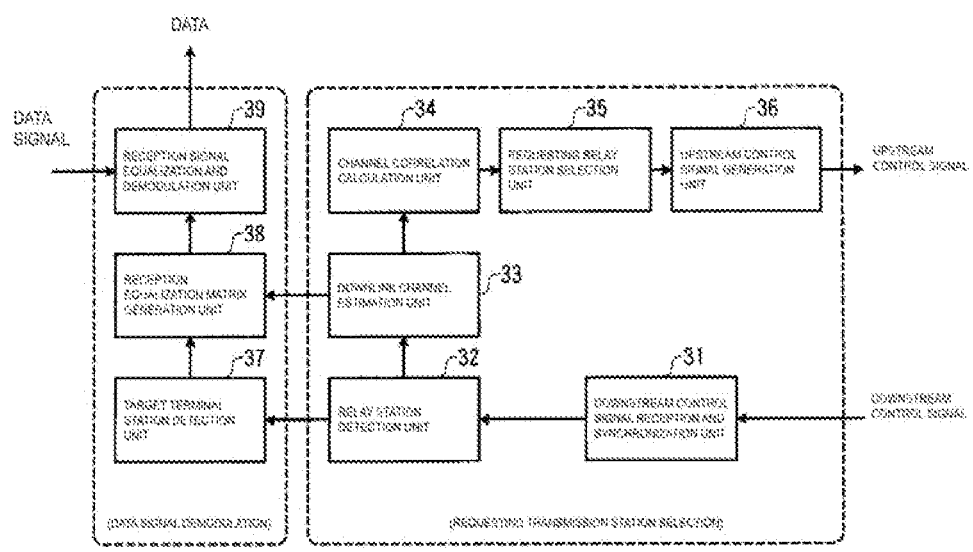
FIG. 4 is a diagram illustrating a configuration example of terminal stations 1, 2, and 3.

FIG. 4 illustrates a configuration example of the terminal stations 1, 2, and 3.

In FIG. 4, the terminal stations 1, 2, and 3 each include a downstream control signal reception and synchronization unit 31, a relay station detection unit 32, a downlink channel estimation unit 33, a channel correlation calculation unit 34, a requesting relay station selection unit 35, an upstream control signal generation unit 36, a target terminal station detection unit 37, a reception equalization matrix generation unit 38, and a reception signal equalization and demodulation unit 39.

Frame Format of Downstream Control Signal and Upstream Control Signal

FIG. 5 illustrates a frame format of the downstream control signal.

In FIG. 5, the downstream control signal includes a known signal for synchronization and estimation, a relay station ID, a target terminal station ID, and data signal frequency band information. Here, on the basis of the upstream control signal received from the terminal station, the relay station for the terminal station is selected, and the frequency band for transmitting the data signal is allocated to transmit the downstream control signal and the data signal.

FIG. 6 illustrates a frame format of the upstream control signal.

In FIG. 6, the upstream control signal includes a known signal for synchronization, a terminal station ID, and a requesting relay station ID.

EXAMPLES

Figure 7:
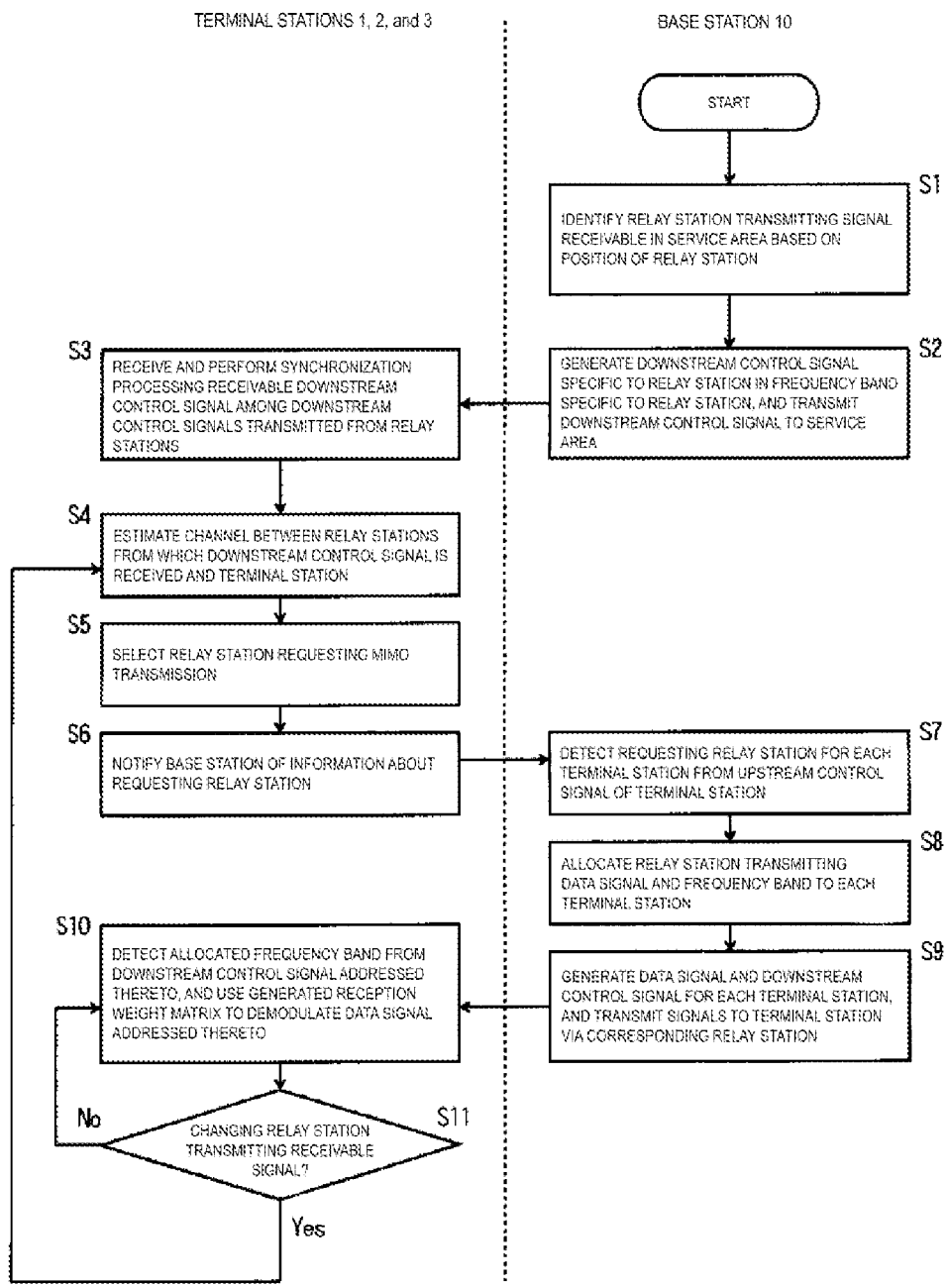
FIG. 7 is a flowchart illustrating an example of a processing procedure of the base station 10 and the terminal stations 1, 2, and 3 according to the present disclosure.

FIG. 7 illustrates an example of a processing procedure of the base station 10 and the terminal stations 1, 2, and 3 according to the present disclosure. Here, as illustrated in FIG. 1, the relay stations A, B, and C are located to be communicable with the terminal stations 1, 2, and 3 in the service area.

In FIGS. 1 to 4 and FIG. 7, the relay station position calculation unit 11 of the base station 10 identifies the relay stations A, B, and C that transmit the signal receivable in the service area of the wireless communication system, for example, based on the position of each relay station calculated from known orbit information (S1). The relay station frequency band allocation unit 12 of the base station 10 allocates the downstream control signals A, B, and C to the different frequency bands as illustrated in FIG. 1 such that the downstream control signals A, B, and C transmitted from the relay stations A, B, and C do not interfere with each other. The downstream control signal and data signal generation unit 13 of the base station 10 generates the downstream control signals unique to each relay station, and transmits the downstream control signals to the service area via the relay stations A, B, and C (S2).

The terminal stations 1, 2, and 3 in the service area receive the receivable downstream control signal among the downstream control signals A, B, and C transmitted from the relay stations A, B, and C at the downstream control signal reception and synchronization unit 31, and executes synchronization processing to acquire control information (S3). For example, in the case of FIG. 1, the terminal station 1 can receive the downstream control signal A of the relay station A, and the terminal stations 2 and 3 can receive the downstream control signals A, B, and C of the relay stations A, B, and C.

The relay station detection unit 32 of each of the terminal stations 1, 2, and 3 detects the relay station based on the relay station ID of the received and performed synchronization processing downstream control signal. The downlink channel estimation unit 33 uses a known signal of the downstream control signal to estimate channel information about a downlink between the detected relay stations and the terminal station (S4). The channel correlation calculation unit 34 calculates the correlation from the channel information of each relay station, and the requesting relay station selection unit 35 selects the relay station that has a low channel correlation and requests MIMO transmission to the relay station that is selected (S5). For example, given that a channel matrix 3×3 generated from the channel information between the three antennas of the terminal station 3 and relay stations A, B, and C is H, the higher a determinant det|H|, the lower the channel correlation and the higher the transmission capacity. Thus, the requesting relay station selection unit 35 may set the presence or absence of MIMO transmission based on the value of a determinant det|H| of a matrix H generated by estimating the channel information at the terminal station 3.

Also, it is not necessary to select all of the relay stations that transmit the receivable signal. For example, the terminal station 2 of FIG. 1 can receive the downstream control signals A, B, and C transmitted from the relay stations A, B, and C. However, when the correlation between relay stations B and C is high, a combination of the relay stations A and B (the example in FIG. 1) or relay stations A and C (a below-mentioned example in FIG. 8) may be selected to request MIMO transmission. In addition, because the number of antennas owned by the terminal stations 1 and 2 is lower than the number of relay stations, it is necessary to select the relay station(s) at or below the number of antennas of the terminal stations.

The upstream control signal generation unit 36 of each of the terminal stations 1, 2, and 3 adds the requesting relay station information to the requesting relay station ID of the upstream control signal, and notifies the base station 10 of it (S6). The notification method at this time may be any method, and may be performed via any relay station or via another transmitting means.

The upstream control signal reception unit 14 of the base station 10 receives the upstream control signals from the terminal stations 1, 2, and 3, and the terminal station detection unit 15 detects the terminal station IDs. Then, the requesting relay station detection unit 16 detects requesting relay stations in which the terminal stations request MIMO transmission (S7). The relay station selection unit 17 allocates the relay station and the frequency band at which the data signal of each of the relay stations 1, 2, and 3 is transmitted, based on the requesting relay station collected from each of the terminal stations 1, 2, and 3 (S8).

The downstream control signal and data signal generation unit 13 of the base station 10 generates the data signals addressed to the terminal stations 1, 2, and 3, which are transmitted in the frequency bands of the relay stations A, B, and C selected by the relay station selection unit 17. Furthermore, the downstream control signal and data signal generation unit 13 generates downstream control signals indicating the correspondence between the data signals addressed to the terminal stations 1, 2, and 3 and the frequency bands, and transmits the resulting downstream control signals to the respective terminal stations 1, 2, and 3 via the respective relay station (S9).

In the example in FIG. 1, for the data signal addressed to the terminal station 1, the data signal A transmitted from the relay station A is allocated to the frequency band W1. For the data signal addressed to the terminal station 2, the data signals A and B transmitted from the relay stations A and B are multiplexed in the frequency band W2, and are MIMO-transmitted. For the data signal addressed to the terminal station 3, the data signals A, B, and C transmitted from the relay stations A, B, and C are multiplexed in the frequency band W3, and are MIMO-transmitted.

Figure 8:
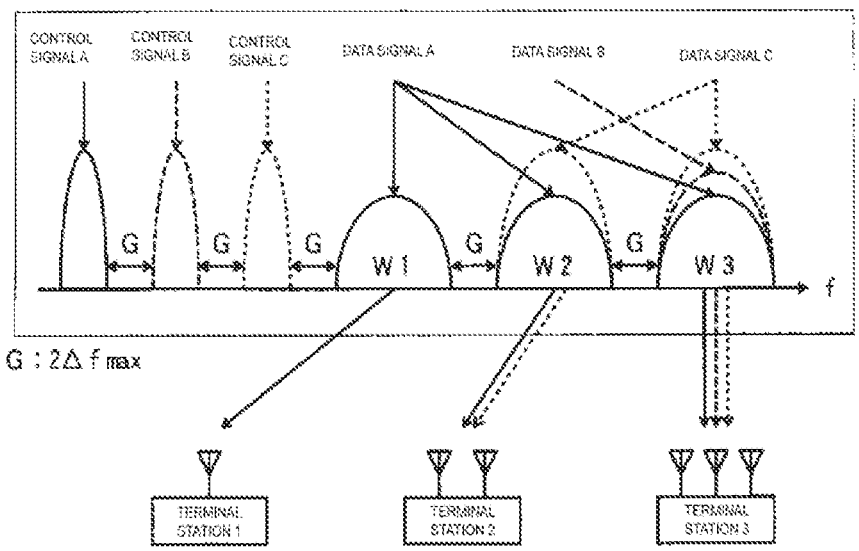
FIG. 8 is a diagram illustrating another allocation pattern according to the present disclosure.

In the example in FIG. 8, for the data signal addressed to the terminal station 2, the data signals A and C transmitted from the relay stations A and C are multiplexed in the frequency band W2, and are MIMO-transmitted. The allocation of the data signals addressed to the terminal stations 1 and 3 is the same as the allocation in the example in FIG. 1.

Figure 9:
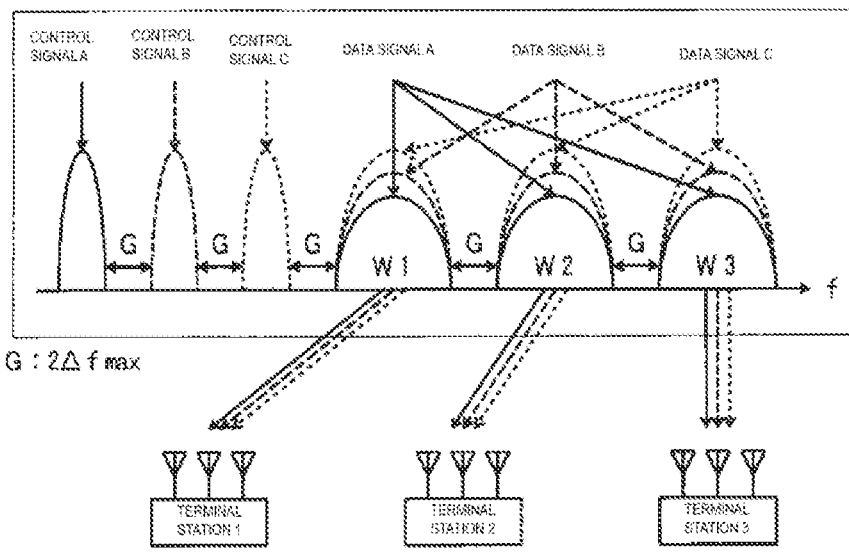
FIG. 9 is a diagram illustrating another allocation pattern according to the present disclosure.

In the example illustrated in FIG. 9, the terminal stations 1, 2, and 3 each include three antennas, and use requesting relay stations A, B, and C. For the data signals addressed to the terminal stations 1, 2, and 3, the data signals A, B, and C transmitted from the relay stations A, B, and C are multiplexed in the frequency bands W1, W2, and W3, respectively, and are MIMO-transmitted.

Figure 10:
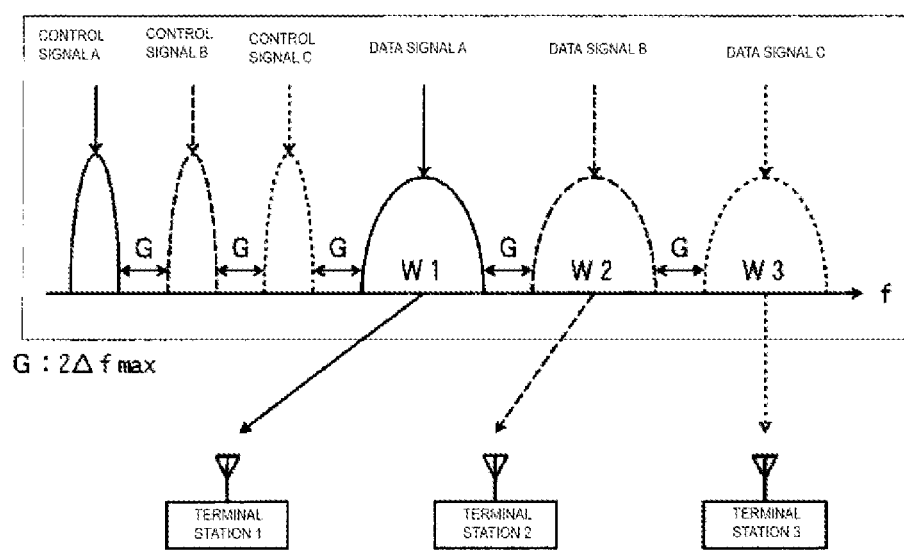
FIG. 10 is a diagram illustrating another allocation pattern according to the present disclosure.

In the example in FIG. 10, the number of antennas in each of the terminal stations 1, 2, and 3 is one, and there is no terminal station capable of performing MIMO transmission. For the data signal addressed to the terminal station 1, the data signal A transmitted from the relay station A is allocated to the frequency band W1, for the data signal addressed to the terminal station 2, the data signal B transmitted from the relay station B is allocated to the frequency band W2, and for the data signal addressed to the terminal station 3, the data signal C transmitted from the relay station C is allocated to the frequency band W3.

Furthermore, when the number of the terminal stations is larger than the number of the relay stations, each frequency band can be addressed by adopting a multiple access scheme such as TDMA. In this case, it can be contemplated to control the allocation of the frequency band according to the distribution of the number of requesting relay stations.

The target terminal station detection unit 37 of each of the terminal stations 1, 2, and 3 detects the downstream control signal addressed thereto from among the downstream control signals A, B, and C. Then, the reception equalization matrix generation unit 38 generates a reception weight matrix using the channel information estimated by the downlink channel estimation unit 33. Next, the reception signal equalization and demodulation unit 39 receives and equalizes the data signal addressed thereto using the reception weight matrix to demodulate data (S10).

Furthermore, similarly to step S3, the terminal stations 1, 2, and 3 sequentially monitor the downstream control signals of the base station 10, and when changing the requesting relay station that can receive the signals due to movement of the relay station or the terminal station, returns to the step S4 to make a request again (S11).

Note that the terminal stations in the service area know the center frequency of the downstream control signal, but recognize the relay station that transmits the downstream control signal by receiving the relay station ID of the downstream control signal illustrated in FIG. 5.

REFERENCE SIGNS LIST 1, 2, 3 Terminal station
10 Base station
A, B, C Relay station
11 Relay station position calculation unit
12 Relay station frequency band allocation unit
13 Downstream control signal and data signal generation unit
14 Upstream control signal reception unit
15 Terminal station detection unit
16 Requesting relay station detection unit
17 Relay station selection unit
21 Signal reception unit
22 Frequency conversion and amplification unit
23 Signal transmission unit
31 Downstream control signal reception and synchronization unit
32 Relay station detection unit
33 Downlink channel estimation unit
34 Channel correlation calculation unit
35 Requesting relay station selection unit
36 Upstream control signal generation unit
37 Target terminal station detection unit
38 Reception equalization matrix generation unit
39 Reception signal equalization and demodulation unit

The invention claimed is:

1. A wireless communication system that includes a base station, a plurality of relay stations that are moving, and a plurality of terminal stations in a service area, and performs downlink multiple access from the base station to each of the plurality of terminal stations via one or more relay stations of the plurality of relay stations, wherein
the base station is configured to frequency multiplex-transmit data signals to each of the plurality of terminal stations, and spatial multiplex-transmit data signals to terminal stations supporting spatial multiplex transmission;

the base station includes a processor; and a storage medium having computer program instructions stored thereon, when executed by the processor, perform to:

identify a relay station of the plurality of relay stations transmitting a respective signal receivable in the service area based on positions of the plurality of relay stations, and one of frequency multiplex-transmit the respective data signal in a different frequency band to each of the plurality of terminal stations via at least one relay station, or spatial multiplex-transmit the respective data signal to a given terminal station of the plurality of terminal stations supporting spatial multiplex transmission in a particular frequency band and via the plurality of relay stations, and transmit a downstream control signal, in a distinct frequency band, from the relay station transmitting the respective signal, the downstream control signal including a relay station ID, wherein the given terminal station of the plurality of terminal stations is configured to receive the downstream control signal that is receivable, synchronize with the downstream control signal that is received, estimate channel information between the relay station and the given terminal station from the downstream control signal that is used for synchronization, select one or more relay stations of the plurality of relay stations transmitting a receivable signal based on the channel information, and notify the base station of the one or more relay stations that are selected, and the computer program instructions further perform to allocate the particular frequency band in which the respective data signal addressed to the given terminal station is spatial multiplex-transmitted via the one or more relay stations selected by the given terminal station, notify the given terminal station of information regarding the particular frequency band that is allocated using the downstream control signal, and spatial multiplex-transmit the respective data signal addressed to the given terminal station.

2. The wireless communication system according to claim 1, wherein the downstream control signal and the data signal both addressed to the given terminal station are generated from a baseband signal and are synchronized with each other, and the given terminal station is configured to demultiplex and demodulate the data signal that is spatial multiplex-transmitted using the channel information estimated from the downstream control signal.

3. The wireless communication system according to claim 1, wherein the given terminal station is configured to monitor the downstream control signal of the one or more relay stations, re-select, when a relay station of the plurality of relay stations transmitting the receivable signal changes, a relay station of the plurality of relay stations through which the spatial multiplex transmission is requested to be performed, and notify the base station of the relay station that is re-selected.

4. A wireless communication system that includes a base station, a plurality of relay stations that are moving, and a plurality of terminal stations in a service area, and performs downlink multiple access from the base station to each of the plurality of terminal stations via one or more relay stations of the plurality of relay stations, wherein the base station is configured to frequency multiplex-transmit data signals to each of the plurality of terminal stations, and spatial multiplex-transmit data signals to terminal stations supporting spatial multiplex transmission;

the base station includes a processor; and a storage medium having computer program instructions stored thereon, when executed by the processor, perform to:

identify a relay station of the plurality of relay stations transmitting a respective signal receivable in the service area based on positions of the plurality of relay stations, spatial multiplex-transmit the respective data signal to a given terminal station of the plurality of terminal stations supporting spatial multiplex transmission in a particular frequency band and via the plurality of relay stations, and transmit a downstream control signal, in a distinct frequency band, from the relay station transmitting the respective signal, the downstream control signal including a relay station ID, wherein the given terminal station of the plurality of terminal stations is configured to receive the downstream control signal that is receivable, synchronize with the downstream control signal that is received, estimate channel information between the relay station and the given terminal station from the downstream control signal that is used for synchronization, select one or more relay stations of the plurality of relay stations transmitting a receivable signal based on the channel information, and notify the base station of the one or more relay stations that are selected, and the computer program instructions further perform to allocate the particular frequency band in which the respective data signal addressed to the given terminal station is spatial multiplex-transmitted via the one or more relay stations selected by the given terminal station, notify the given terminal station of information regarding the particular frequency band that is allocated using the downstream control signal, and spatial multiplex-transmit the respective data signal addressed to the given terminal station.

* * * * *